United States Patent
Bennett et al.

(10) Patent No.: US 7,124,327 B2
(45) Date of Patent: *Oct. 17, 2006

(54) CONTROL OVER FAULTS OCCURRING DURING THE OPERATION OF GUEST SOFTWARE IN THE VIRTUAL-MACHINE ARCHITECTURE

(75) Inventors: Steve Bennett, Hillsboro, OR (US); Andrew V. Anderson, Hillsboro, OR (US); Stalinselvaraj Jeyasingh, Portland, OR (US); Alain Kagi, Portland, OR (US); Gilbert Neiger, Portland, OR (US); Richard Uhlig, Hillsboro, OR (US); Xiang Zou, Beaverton, OR (US); Michael A. Kozuch, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 443 days.

This patent is subject to a terminal disclaimer.

(21) Appl. No.: 10/184,774

(22) Filed: Jun. 29, 2002

(65) Prior Publication Data
US 2004/0003323 A1 Jan. 1, 2004

(51) Int. Cl.
*G06F 11/00* (2006.01)

(52) U.S. Cl. .......................... 714/38; 714/48

(58) Field of Classification Search ................ 714/47, 714/48, 38
See application file for complete search history.

(56) References Cited

U.S. PATENT DOCUMENTS

| | | | |
|---|---|---|---|
| 3,699,532 A | 10/1972 | Schaffer et al. | |
| 3,996,449 A | 12/1976 | Attanasio et al. | |
| 4,037,214 A | 7/1977 | Birney et al. | |
| 4,162,536 A | 7/1979 | Morley | |
| 4,207,609 A | 6/1980 | Luiz et al. | |
| 4,247,905 A | 1/1981 | Yoshida et al. | 711/166 |
| 4,276,594 A | 6/1981 | Morley | |
| 4,278,837 A | 7/1981 | Best | |
| 4,307,447 A | 12/1981 | Provanzano et al. | |
| 4,319,233 A | 3/1982 | Matsuoka et al. | |
| 4,319,323 A | 3/1982 | Ermolovich et al. | |
| 4,347,565 A | 8/1982 | Kaneda et al. | |
| 4,366,537 A | 12/1982 | Andrew et al. | |
| 4,403,283 A | 9/1983 | Myntti et al. | |
| 4,419,724 A | 12/1983 | Branigin et al. | |
| 4,430,709 A | 2/1984 | Schleupen et al. | |
| 4,521,852 A | 6/1985 | Guttag | |
| 4,571,672 A | 2/1986 | Hatada et al. | |
| 4,621,318 A | 11/1986 | Maeda | |

(Continued)

FOREIGN PATENT DOCUMENTS

DE 4217444 12/1992

(Continued)

OTHER PUBLICATIONS

Berg, Cliff, "How Do I Create A Signed Applet?" Dr. Dobb's Journal, Aug. 1997, pp. 1-9.

(Continued)

*Primary Examiner*—Bryce P. Bonzo
*Assistant Examiner*—Yolanda L. Wilson
(74) *Attorney, Agent, or Firm*—Blakely, Sokoloff, Taylor & Zafman LLP

(57) ABSTRACT

In one embodiment, fault information relating to a fault associated with the operation of guest software is received. Further, a determination is made as to whether the fault information satisfies one or more filtering criterion. If the determination is positive, control remains with the guest software and is not transferred to the virtual machine monitor (VMM).

22 Claims, 9 Drawing Sheets

U.S. PATENT DOCUMENTS

| | | |
|---|---|---|
| 4,759,064 A | 7/1988 | Chaum |
| 4,795,893 A | 1/1989 | Ugon |
| 4,802,084 A | 1/1989 | Ikegaya et al. |
| 4,812,967 A * | 3/1989 | Hirosawa et al. ............ 710/269 |
| 4,825,052 A | 4/1989 | Chemin et al. |
| 4,907,270 A | 3/1990 | Hazard |
| 4,907,272 A | 3/1990 | Hazard |
| 4,910,774 A | 3/1990 | Barakat |
| 4,975,836 A | 12/1990 | Hirosawa et al. |
| 5,007,082 A | 4/1991 | Cummins |
| 5,022,077 A | 6/1991 | Bealkowski et al. |
| 5,043,878 A * | 8/1991 | Ooi ............................ 712/42 |
| 5,075,842 A | 12/1991 | Lai |
| 5,079,737 A | 1/1992 | Hackbarth .................. 711/164 |
| 5,187,802 A | 2/1993 | Inoue et al. |
| 5,230,069 A | 7/1993 | Brelsford et al. |
| 5,237,616 A | 8/1993 | Abraham et al. |
| 5,255,379 A | 10/1993 | Melo |
| 5,287,363 A | 2/1994 | Wolf et al. |
| 5,293,424 A | 3/1994 | Hotley et al. |
| 5,295,251 A | 3/1994 | Wakui et al. |
| 5,317,705 A | 5/1994 | Gannon et al. |
| 5,319,760 A | 6/1994 | Mason et al. |
| 5,361,375 A | 11/1994 | Ogi |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,469,557 A | 11/1995 | Salt et al. |
| 5,473,692 A | 12/1995 | Davis |
| 5,479,509 A | 12/1995 | Ugon |
| 5,504,922 A | 4/1996 | Seki et al. |
| 5,506,975 A | 4/1996 | Onodera |
| 5,511,217 A | 4/1996 | Nakajima et al. |
| 5,522,075 A * | 5/1996 | Robinson et al. ............ 718/100 |
| 5,528,231 A | 6/1996 | Patarin |
| 5,533,126 A | 7/1996 | Hazard et al. |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubals |
| 5,566,323 A | 10/1996 | Ugon |
| 5,568,552 A | 10/1996 | Davis |
| 5,574,936 A | 11/1996 | Ryba et al. |
| 5,582,717 A | 12/1996 | Di Santo |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,633,929 A | 5/1997 | Kaliski, Jr. |
| 5,657,445 A | 8/1997 | Pearce |
| 5,668,971 A | 9/1997 | Neufeld |
| 5,684,948 A | 11/1997 | Johnson et al. |
| 5,706,469 A | 1/1998 | Kobayashi |
| 5,717,903 A | 2/1998 | Bonola |
| 5,720,609 A | 2/1998 | Pfefferle |
| 5,721,222 A | 2/1998 | Bernstein et al. |
| 5,729,760 A | 3/1998 | Poisner |
| 5,737,604 A | 4/1998 | Miller et al. |
| 5,737,760 A | 4/1998 | Grimmer, Jr. et al. ...... 711/163 |
| 5,740,178 A | 4/1998 | Jacks et al. |
| 5,752,046 A | 5/1998 | Oprescu et al. |
| 5,757,919 A | 5/1998 | Herbert et al. |
| 5,764,969 A | 6/1998 | Kahle |
| 5,796,835 A | 8/1998 | Saada |
| 5,796,845 A | 8/1998 | Serikawa et al. |
| 5,805,712 A | 9/1998 | Davis |
| 5,809,546 A | 9/1998 | Greenstein et al. |
| 5,825,875 A | 10/1998 | Ugon |
| 5,825,880 A | 10/1998 | Sudia et al. |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,867,577 A | 2/1999 | Patarin |
| 5,872,994 A | 2/1999 | Akiyama et al. |
| 5,890,189 A | 3/1999 | Nozue et al. |
| 5,900,606 A | 5/1999 | Rigal |
| 5,901,225 A | 5/1999 | Ireton et al. |
| 5,903,752 A | 5/1999 | Dingwall et al. |
| 5,919,257 A | 7/1999 | Trostle |
| 5,935,242 A | 8/1999 | Madany et al. |
| 5,935,247 A | 8/1999 | Pai et al. |
| 5,937,063 A | 8/1999 | Davis |
| 5,944,821 A | 8/1999 | Angelo |
| 5,953,502 A | 9/1999 | Helbig, Sr. |
| 5,956,408 A | 9/1999 | Arnold |
| 5,970,147 A | 10/1999 | Davis et al. |
| 5,978,475 A | 11/1999 | Schneier et al. |
| 5,978,481 A | 11/1999 | Ganesan et al. |
| 5,987,557 A | 11/1999 | Ebrahim |
| 6,014,745 A | 1/2000 | Ashe |
| 6,035,374 A | 3/2000 | Panwar et al. |
| 6,044,478 A | 3/2000 | Green |
| 6,055,637 A | 4/2000 | Hudson et al. |
| 6,058,478 A | 5/2000 | Davis |
| 6,061,794 A | 5/2000 | Angelo |
| 6,075,938 A * | 6/2000 | Bugnion et al. ............... 703/27 |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor et al. |
| 6,101,584 A | 8/2000 | Satou et al. |
| 6,108,644 A | 8/2000 | Goldschlag et al. |
| 6,115,816 A | 9/2000 | Davis |
| 6,125,430 A | 9/2000 | Noel et al. |
| 6,131,166 A | 10/2000 | Wong-Insley |
| 6,148,379 A | 11/2000 | Schimmel |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone |
| 6,182,089 B1 | 1/2001 | Ganapathy et al. |
| 6,188,257 B1 | 2/2001 | Buer |
| 6,192,455 B1 | 2/2001 | Bogin et al. |
| 6,199,152 B1 | 3/2001 | Kelly et al. |
| 6,205,550 B1 | 3/2001 | Nardone et al. |
| 6,212,635 B1 | 4/2001 | Reardon |
| 6,222,923 B1 | 4/2001 | Schwenk |
| 6,237,061 B1 | 5/2001 | Srinivasan et al. |
| 6,249,872 B1 | 6/2001 | Wildgrube et al. ......... 713/200 |
| 6,252,650 B1 | 6/2001 | Nakaumra |
| 6,269,392 B1 | 7/2001 | Cotichini et al. |
| 6,272,533 B1 | 8/2001 | Browne et al. ............. 709/213 |
| 6,272,637 B1 | 8/2001 | Little et al. ................. 713/194 |
| 6,275,933 B1 | 8/2001 | Fine et al. |
| 6,282,650 B1 | 8/2001 | Davis |
| 6,282,651 B1 | 8/2001 | Ashe |
| 6,282,657 B1 | 8/2001 | Kaplan et al. |
| 6,292,874 B1 | 9/2001 | Barnett ....................... 711/153 |
| 6,301,646 B1 | 10/2001 | Hostetter |
| 6,308,270 B1 | 10/2001 | Guthery et al. |
| 6,314,409 B1 | 11/2001 | Schneck et al. |
| 6,321,314 B1 | 11/2001 | Van Dyke |
| 6,327,652 B1 | 12/2001 | England et al. |
| 6,330,670 B1 | 12/2001 | England et al. |
| 6,339,815 B1 | 1/2002 | Feng |
| 6,339,816 B1 | 1/2002 | Bausch |
| 6,357,004 B1 | 3/2002 | Davis |

| | | |
|---|---|---|
| 6,363,485 B1 | 3/2002 | Adams |
| 6,374,286 B1 | 4/2002 | Gee et al. |
| 6,374,317 B1 | 4/2002 | Ajanovic et al. ........... 710/105 |
| 6,378,068 B1 | 4/2002 | Foster |
| 6,378,072 B1 | 4/2002 | Collins et al. |
| 6,389,537 B1 | 5/2002 | Davis et al. |
| 6,397,242 B1* | 5/2002 | Devine et al. ................ 718/1 |
| 6,397,379 B1 | 5/2002 | Yates, Jr. et al. |
| 6,412,035 B1 | 6/2002 | Webber |
| 6,421,702 B1 | 7/2002 | Gulick |
| 6,435,416 B1 | 8/2002 | Slassi |
| 6,445,797 B1 | 9/2002 | McGough et al. |
| 6,463,535 B1 | 10/2002 | Drews et al. |
| 6,463,537 B1 | 10/2002 | Tello |
| 6,499,123 B1 | 12/2002 | McFarland et al. |
| 6,505,279 B1 | 1/2003 | Phillips et al. |
| 6,507,904 B1 | 1/2003 | Ellison et al. |
| 6,529,909 B1 | 3/2003 | Bowman-Amuah |
| 6,535,988 B1 | 3/2003 | Poisner |
| 6,557,104 B1 | 4/2003 | Vu et al. |
| 6,560,627 B1 | 5/2003 | McDonald et al. |
| 6,609,199 B1 | 8/2003 | DeTreville |
| 6,615,278 B1 | 9/2003 | Curtis |
| 6,633,963 B1 | 10/2003 | Ellison et al. |
| 6,633,981 B1 | 10/2003 | Davis |
| 6,651,171 B1 | 11/2003 | England et al. |
| 6,678,825 B1 | 1/2004 | Ellison et al. |
| 6,684,326 B1 | 1/2004 | Cromer et al. |
| 2001/0021969 A1 | 9/2001 | Burger et al. |
| 2001/0027511 A1 | 10/2001 | Wakabayashi et al. |
| 2001/0027527 A1 | 10/2001 | Khidekel et al. |
| 2001/0037450 A1 | 11/2001 | Metlitski et al. |
| 2002/0007456 A1 | 1/2002 | Peinado et al. |
| 2002/0023032 A1 | 2/2002 | Pearson et al. |
| 2002/0147916 A1 | 10/2002 | Strongin et al. |
| 2002/0166061 A1 | 11/2002 | Falik et al. |
| 2002/0169717 A1 | 11/2002 | Challener |
| 2003/0018892 A1 | 1/2003 | Tello |
| 2003/0074548 A1 | 4/2003 | Cromer et al. |
| 2003/0115453 A1 | 6/2003 | Grawrock |
| 2003/0126442 A1 | 7/2003 | Glew et al. |
| 2003/0126453 A1 | 7/2003 | Glew et al. |
| 2003/0159056 A1 | 8/2003 | Cromer et al. |
| 2003/0188179 A1 | 10/2003 | Challener et al. |
| 2003/0196085 A1 | 10/2003 | Lampson et al. |
| 2003/0217250 A1* | 11/2003 | Bennett et al. ............. 712/224 |
| 2004/0064813 A1* | 4/2004 | Neiger et al. ................. 718/1 |
| 2004/0117532 A1* | 6/2004 | Bennett et al. ............. 710/260 |
| 2004/0117539 A1 | 6/2004 | Bennett et al. |

FOREIGN PATENT DOCUMENTS

| | | |
|---|---|---|
| EP | 0473913 | 3/1992 |
| EP | 0600112 A1 | 6/1994 |
| EP | 0602867 | 6/1994 |
| EP | 0892521 | 1/1999 |
| EP | 0930567 A3 | 7/1999 |
| EP | 0961193 | 12/1999 |
| EP | 0965902 | 12/1999 |
| EP | 1030237 | 8/2000 |
| EP | 1055989 | 11/2000 |
| EP | 1056014 | 11/2000 |
| EP | 1085396 | 3/2001 |
| EP | 1146715 A1 | 10/2001 |
| EP | 1209563 | 5/2002 |
| EP | 1271277 | 1/2003 |
| GB | 1495729 A | 12/1977 |
| JP | 2000076139 | 3/2000 |
| WO | WO9524696 | 9/1995 |
| WO | WO9729567 | 8/1997 |
| WO | WO9812620 | 3/1998 |
| WO | WO 98/34365 | 8/1998 |
| WO | WO 98/44402 | 10/1998 |
| WO | WO 99/05600 | 2/1999 |
| WO | WO 99/09482 | 2/1999 |
| WO | WO9918511 | 4/1999 |
| WO | WO 99/57863 | 11/1999 |
| WO | WO9965579 | 12/1999 |
| WO | WO0021238 | 4/2000 |
| WO | WO 00/62232 | 10/2000 |
| WO | WO0127723 | 4/2001 |
| WO | WO0127821 | 4/2001 |
| WO | WO0163994 | 8/2001 |
| WO | WO0175565 | 10/2001 |
| WO | WO0175595 | 10/2001 |
| WO | WO0201794 | 1/2002 |
| WO | WO0217555 | 2/2002 |
| WO | WO02060121 | 8/2002 |
| WO | WO0175564 | 10/2002 |
| WO | WO02086684 | 10/2002 |
| WO | WO03058412 | 7/2003 |

OTHER PUBLICATIONS

Goldberg, Robert P., "Survey of Virtual Machine Research," IEEE Computer Magazine vol. 7, No. 6, pp. 34-45, 1974.

Gong, Li, et al., "Going Beyond the Sandbox: An Overview of the New Security Architecture in the Java Development Kit 1.2," JavaSoft, Sun Microsystems, Inc., Proceedings of the USENIX Symposium on Internet Technologies and Systems, Monterey, California, 11 pages Dec. 1997.

Gum, P.H., "System/370 Extended Architecture: Facilities for Virtual Machines," IBM J. Research Development, vol. 27, No. 6, pp. 530-544, Nov. 1983.

Heinrich, J., "MIPS R4000 Microprocessor User's Manual," Second Edition, Chapter 4: Memory Management, pp. 67-79, 1994.

Heinrich, J., "MIPS R4000 Microprocessor User's Manual," Chapter 4, Memory Management, pp. 61-97, 1993.

Intel Corporation, Intel386™ DX Microprocessor, 32-Bit CHMOS Microprocessor With Integrated Memory Management, 56 pages, Dec. 1995.

Lawton, K., "Running Multiple Operation Systems Concurrently On An IA32 PC Using Virtualization Techniques," http://www.plex86.org/research/paper.txt., pp. 1-31, downloaded Aug. 9, 2001.

Motorola, M68040 User's Manual (Including the MC68040, MC68040V, MC68LC040, MC68EC040, and MC68EC040V), Revised 1993.

Rosenblum, M., "VMware's Virtual Platform™ A Virtual Machine Monitor for Commodity PCs," Proceedings of the 11th Hotchips Conference, Stanford University Palo Alto, California, pp. 185-196, Aug. 1999.

Trusted Computing Platform Alliance (TCPA), Main Specification Version 1.1a, 321 pages, Copyright 2000-2001.

Brands, Stefan, "Restrictive Blinding of Secret-Key Certificates", *Springer-Verlag XP002201306*, (1995),Chapter 3.

Chien, Andrew A., et al., "Safe and Protected Execution for the Morph/AMRM Reconfigurable Processor", *7th Annual IEEE Symposium, FCCM '99 Proceedings, XP010359180, ISBN 0-7695-0375-6, Los Alamitos, CA*, (Apr. 21, 1999),209-221.

Coulouris, George, et al., "Distributed Systems, Concepts and Designs", *2nd Edition*, (1994),422-424.

Crawford, John , "Architecture of the Intel 80386", *Proceedings of the IEEE International Conference on Computer Design: VLSI in Computers and Processors (ICCD '86)*, (Oct. 6, 1986), 155-160.

Davida, George I., et al., "Defending Systems Against Viruses through Cryptographic Authentication", *Proceedings of the Symposium on Security and Privacy*, IEEE Comp. Soc. Press, ISBN 0-8186-1939-2,(May 1989).

Fabry, R.S. , "Capability-Based Addressing", *Fabry, R.S., "Capability-Based Addressing," Communications of the ACM, vol. 17, No. 7*, (Jul. 1974),403-412.

Frieder, Gideon , "The Architecture And Operational Characteristics of the VMX Host Machine", *The Architecture And Operational Characteristics of the VMX Host Machine, IEEE*, (1982),9-16.

HP Mobile Security Overview, "HP Mobile Security Overview", (Sep. 2002),1-10.

IBM, "Information Display Technique for a Terminate Stay Resident Program IBM Technical Disclosure Bulletin", *TDB-ACC-No. NA9112156, vol. 34, Issue 7A*, (Dec. 1, 1991),156-158.

IBM Corporation, "IBM ThinkPad T30 Notebooks", *IBM Product Specification*, located at www-1.ibm.com/services/files/cisco_t30_spec_sheet_070202.pdf, last visited Jun. 23, 2004,(Jul. 2, 2002),1-6.

Intel, "IA-32 Intel Architecture Software Developer's Manual", *vol. 3: System Programming Guide*, Intel Corporation—2003, 13-1 through 13-24.

Intel Corporation, "IA-64 System Abstraction Layer Specification", *Intel Product Specification, Order No. 245359-001*, (Jan. 2000),1-112.

Intel Corporation, "Intel 82802AB/82802AC Firmware Hub (FWH)", *Intel Product Datasheet*, Document No. 290658-004,(Nov. 2000),1-6, 17-28.

Intel Corporation, "Intel IA-64 Architecture Software Developer's Manual", *vol. 2: IA-64 System Architecture, Order No. 245318-001*, (Jan. 2000),i, ii, 5.1-5.3, 11.1-11.8, 11.23-11.26.

Karger, Paul A., et al., "A VMM Security Kernal for the VAX Architecture", *Proceedings of the Symposium on Research in Security and Privacy, XP010020182, ISBN 0-8186-2060-9, Boxborough, MA*, (May 7, 1990), 2-19.

Kashiwagi, Kazuhiko , et al., "Design and Implementation of Dynamically Reconstructing System Software", *Software Engineering Conference*, Proceedings 1996 Asia-Pacific Seoul, South Korea Dec. 4-7, 1996, Los Alamitos, CA USA, IEEE Comput. Soc, US, ISBN 0-8186-7638-8,(1996).

Luke, Jahn , et al., "Replacement Strategy for Aging Avionics Computers", *IEEE AES Systems Magazine*, XP002190614,(Mar. 1999).

Menezes, Alfred J., et al., "Handbook of Applied Cryptography", *CRC Press LLC, USA XP002201307*, (1997),475.

Menezes, Alfred J., et al., "Handbook of Applied Cryptography", *CRC Press Series on Discrete Mathematics and its Applications*, Boca Raton, FL, XP002165287, ISBN 0849385237,(Oct. 1996),403-405, 506-515, 570.

Nanba, S. , et al., "VM/4: ACOS-4 Virtual Machine Architecture", *VM/4: ACOS-4 Virtual Machine Architecture, IEEE*, (1985),171-178.

Richt, Stefan , et al., "In Circuit-Emulator Wird Echtzeittauglich", *Elektronic, Franzis Verlag GMBH, Munchen, DE*, vol. 40, No. 16, XP000259620,(100-103), Aug. 6, 1991.

Robin, John S., et al., "Analysis of the Pentium's Ability to Support a Secure Virtual Machine Monitor", *Proceedings of the 9th USENIX Security Symposium, XP002247347, Denver, Colorado*, (Aug. 14, 2000), 1-17.

RSA Security, "Hardware Authenticators", www.rsasecurity.com/node.asp?id=1158, 1-2.

RSA Security, "RSA SecurID Authenticators", www.rsasecurity.com/products/securid/datasheets/SID_DS_0103.pdf, 1-2.

RSA Security, "Software Authenticators", www.srasecurity.com/node.asp?id=1313, 1-2.

Saez, Sergio , et al., "A Hardware Scheduler for Complex Real-Time Systems", *Proceedings of the IEEE International Symposium on Industrial Electronics*, XP002190615,(Jul. 1999),43-48.

Schneier, Bruce, "Applied Cryptography: Protocols, Algorithm, and Source Code in C", *Wiley, John & Sons, Inc.*, XP002939871; ISBN 0471117099,(Oct. 1995),47-52.

Schneier, Bruce, "Applied Cryptography: Protocols, Algorithm, and Source Code in C", *Wiley, John & Sons, Inc.*, XP002138607; ISBN 0471117099,(Oct. 1995),56-65.

Schneier, Bruce, "Applied Cryptography: Protocols, Algorithms, and Source Code C", *Wiley, John & Sons, Inc.*, XP0021111449; ISBN 0471117099,(Oct. 1995),169-187.

Schneier, Bruce , "Applied Cryptography: Protocols, Algorithms, and Source Code C", *2nd Edition; Wiley, John & Sons, Inc.*, XP002251738; ISBN 0471128457,(Nov. 1995),28-33; 176-177; 216-217; 461-473; 518-522.

Sherwood, Timothy, et al., "Patchable Instruction ROM Architecture", *Department of Computer Science and Engineering, University of California, San Diego, La Jolla, CA*, (Nov. 2001).

Tsai et al. "On the Architectural Support for Logical Machine Systems". Microprogramming. Feb. 22, 1998.*

Hall, Judith S., et al., "Virtualizing the VAX Architecture," ACM Sigarch Computer Architecture News, Proceedings of the 18th annual international symposium on Computer architecture, vol. 19, Issue No. 3, Apr. 1991, 10 pages.

Shang Rong Tsai, et al.:"On The Main Architectural Support for Logical Machine Systems." Microprocessing and Microprogramming, Elsevier Science Publishers, BV., Amsterdam, NL vol. 22, No. 2 Feb. 1988, pp. 81-98.

PCT International Search Report for PCT Application No. PCT/US 03/18667, Mailed on Dec. 12, 2004, 7 pages.

* cited by examiner

CONTROL OVER FAULTS OCCURRING DURING THE OPERATION OF GUEST SOFTWARE IN THE VIRTUAL-MACHINE ARCHITECTURE

FIELD OF THE INVENTION

The present invention relates generally to virtual machines, and more specifically to handling faults associated with the operation of guest software in the virtual-machine architecture.

BACKGROUND OF THE INVENTION

A conventional virtual-machine monitor (VMM) typically runs on a computer and presents to other software the abstraction of one or more virtual machines. Each virtual machine may function as a self-contained platform, running its own "guest operating system" (i.e., an operating system (OS) hosted by the VMM) and other software, collectively referred to as guest software. The guest software expects to operate as if it were running on a dedicated computer rather than a virtual machine. That is, the guest software expects to control various events and have access to hardware resources. The hardware resources may include processor-resident resources (e.g., control registers), resources that reside in memory (e.g., descriptor tables) and resources that reside on the underlying hardware platform (e.g., input-output devices). The events may include interrupts, exceptions, platform events (e.g., initialization (INIT) or system management interrupts (SMIs)), etc.

In a virtual-machine environment, the VMM should be able to have ultimate control over these events and hardware resources to provide proper operation of guest software running on the virtual machines and for protection from and between guest software running on the virtual machines. To achieve this, the VMM typically receives control when guest software accesses a protected resource or when other events (such as interrupts or exceptions) occur.

For example, when a page fault (i.e., an exception associated with an address-translation operation) occurs during the operation of guest software, the control is transferred to the VMM which then determines whether the guest software or the VMM itself needs to handle the page fault. If the page fault needs to be handled by the guest software, the control is transferred back to the guest software. Because page faults (as well as other exceptions and interrupts) that do not need to be handled by the VMM occur rather frequently, there is a significant performance cost associated with such transitioning of control between the VMM and the guest software.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EMBODIMENTS

Figure 1:
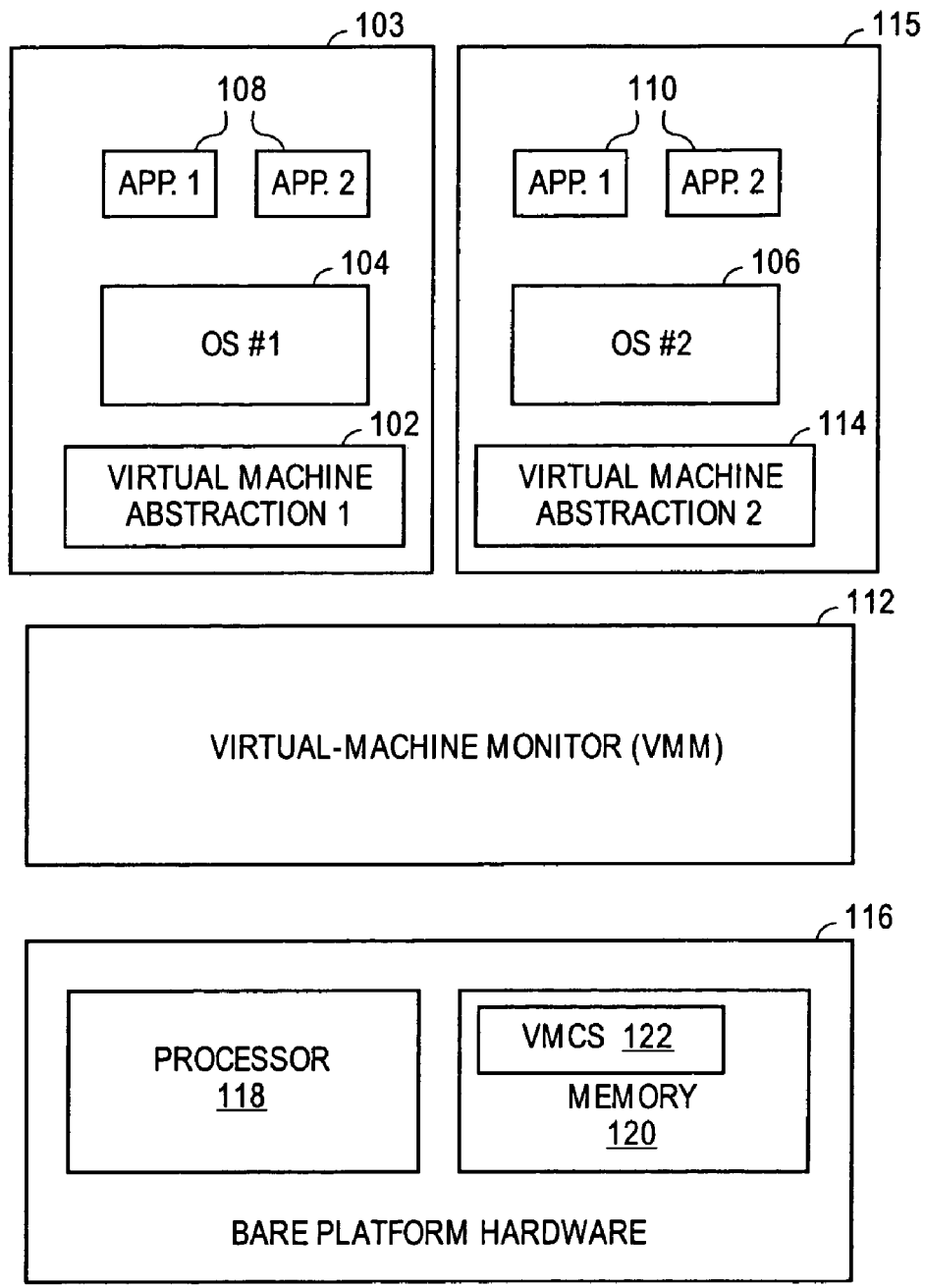
FIG. 1 illustrates one embodiment of a virtual-machine environment, in which the present invention may operate.

A method and apparatus for handling faults associated with operation of guest software in a virtual-machine architecture are described. In the following description, for purposes of explanation, numerous specific details are set forth in order to provide a thorough understanding of the present invention. It will be apparent, however, to one skilled in the art that the present invention can be practiced without these specific details.

Some portions of the detailed descriptions that follow are presented in terms of algorithms and symbolic representations of operations on data bits within a computer system's registers or memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

FIG. 1 illustrates one embodiment of a virtual-machine environment 100, in which the present invention may operate. In this embodiment, bare platform hardware 116 comprises a computing platform, which may be capable, for example, of executing a standard operating system (OS) or a virtual-machine monitor (VMM), such as a VMM 112. The VMM 112, though typically implemented in software, may emulate and export a bare machine interface to higher level software. Such higher level software may comprise a standard or real-time OS, may be a highly stripped down operating environment with limited operating system functionality, may not include traditional OS facilities, etc. Alternatively, for example, the VMM 112 may be run within, or on top of, another VMM. VMMs and their typical features and functionality are well-known by those skilled in the art and may be implemented, for example, in software, firmware or by a combination of various techniques.

The platform hardware 116 can be of a personal computer (PC), mainframe, handheld device, portable computer, set-top box, or any other computing system. The platform hardware 116 includes a processor 118, memory 120 and possibly other platform hardware (e.g. input-output devices), not shown.

Processor 118 can be any type of processor capable of executing software, such as a microprocessor, digital signal processor, microcontroller, or the like. The processor 118 may include microcode, programmable logic or hardcoded logic for performing the execution of method embodiments of the present invention.

Memory 120 can be a hard disk, a floppy disk, random access memory (RAM), read only memory (ROM), flash memory, any combination of the above devices, or any other type of machine medium readable by processor 118. Memory 120 may store instructions or data for performing the execution of method embodiments of the present invention.

The VMM 112 presents to other software (i.e., "guest" software) the abstraction of one or more virtual machines (VMs). The VMM 112 may provide the same or different abstractions to the various guests. FIG. 1 shows two such VMs, 102 and 114, though more or less than 2 VMs may be supported by the VMM 112. The guest software running on each VM may include a guest OS such as a guest OS 104 or 106 and various guest software applications 108 and 110. Collectively, guest OS and software applications are referred to herein as guest software 103 and 115. Guest software 103 and 105 expects to access physical resources (e.g., processor registers, memory and I/O devices) within the VMs 102 and 114 on which the guest software is running. The VMM 112 facilitates access to resources desired by guest software while retaining ultimate control over resources within the platform hardware 116.

Further, the guest software 103 and 115 expects to handle various events such as exceptions, interrupts and platform events (e.g., initialization (INIT) and system management interrupts (SMIs)). Some of these events are "privileged" because they must be handled by the VMM 112 to ensure proper operation of VMs 102 and 114 and guest software 103 and 115 and for protection from and between guest software 103 and 115. For the privileged events, the VMM 112 facilitates functionality desired by guest software while retaining ultimate control over these privileged events. The act of facilitating the functionality for the guest software may include a wide variety of activities on the part of the VMM 112. The activities of the VMM 112, as well as its characteristics, should not limit the scope of the present invention.

In addition to the privileged events, there are a number of "non-privileged events" that occur during the operation of guest software but do not need to be handled by the VMM 112, and as such do not require a transfer of control to the VMM 112. In one embodiment, a filtering mechanism is provided to distinguish between privileged events and non-privileged events. With this filtering mechanism, information associated with a current event (e.g., an exception) is evaluated using one or more filtering criteria to determine whether control over the current event remains with the guest software or is transferred to the VMM 112. These filtering criteria are referred to herein as control transfer filtering criteria. The information associated with the current event is referred to herein as fault information.

In another embodiment, a filtering mechanism is provided to identify certain non-privileged events that can be disregarded because other factors present at the time of the current event indicate that the guest software can complete the desired operation without compromising security and proper operation of the VMM 112 or other VMs. In this embodiment, fault information associated with the current event is evaluated using one or more filtering criteria to determine whether the current event may be disregarded (i.e., whether the guest software is allowed to complete the desired operation). These filtering criteria are referred to herein as fault filtering criteria.

In one embodiment, the filtering criteria (control transfer filtering criteria and/or fault filtering criteria) are defined using data stored in one or more designated fields in a virtual machine control structure (VMCS) 122. Different VMs may use data from different VMCS memory images, though only one such VMCS is shown in FIG. 1. The VMCS 122 may reside in memory 120 and is maintained by the processor 118. It should be noted that any other data structure (e.g., an on-chip cache, a file, a lookup table, etc.) may be used to store the VMCS 122 or the fields associated with the filtering mechanism without loss of generality. Various embodiments of the filtering mechanism will be described in greater detail below.

In one embodiment, if the filtering mechanism determines that the current event must be handled by the VMM 112, control is transferred to the VMM 112. The VMM 112 may then handle the event and transfer control back to guest software. In one embodiment, the transfer of control from the VMM 112 to the guest software is achieved by executing a special instruction. The transfer of control from the VMM to the guest software is referred to herein as a VM entry and the transfer of control from the guest software to the VMM is referred to herein as a VM exit, and potential causes of VM exits (e.g., privileged exceptions and interrupts and privileged platform events) are referred to herein as virtualization events.

In one embodiment, when a VM exit occurs, control is passed to the VMM 112 at a specific entry point (e.g., an instruction pointer value) delineated in the VMCS 122. In another embodiment, control is passed to the VMM 112 after vectoring through a redirection structure (e.g., the interrupt-descriptor table in the processor instruction set architecture (ISA) of the Intel® Pentium® IV (referred to herein as the IA-32 ISA)). Alternatively, any other mechanism known in the art can be used to transfer control from the guest software to the VMM 112.

Privileged and non-privileged events that include exceptions, interrupts and platform events are referred to herein as faults. A fault may be generated by the execution of an instruction on the processor. For example, an operation that accesses memory may cause a variety of faults due to paging and segmentation protection mechanisms. Each fault is associated with fault information. Fault information may be characterized as dynamic, static or semi-dynamic fault information. Dynamic fault information is generated at or near the time of the fault. Examples of the dynamic fault information include an error code which is generated by an exception and depends directly on the characteristics of the faulting operation or a data value which was intended to be written to memory by a write memory operation causing a page fault.

Static or semi-static fault information is likely to have the same value regardless of the timing of the fault. An example of semi-static fault information is the settings of bits in various control registers which rarely change, such as, for example, the cache disable (CD) or write-protect (WP) bits in the CR0 register in the IA-32 ISA. An example of static fault information is the version of the processor implementation (as is, for example, reported through the CPUID instruction in the IA-32 ISA).

Generally speaking, fault information may include a fault identifier, an associated fault error code, additional data values associated with the fault, or any combination of these data items. The fault identifier may be a value that is used to differentiate this particular fault from other faults. The error code may consist of a number of values, with each value being indicative of an occurrence of a particular condition. The additional data values may represent any other data connected to the faulting instruction or the fault triggering condition. In addition, the additional data values may represent data that is calculated during the generation of the fault. Some examples of the additional data values include data requested to be written to a particular location at the time of the fault, the address being accessed at the time of the fault, the address of the instruction that caused the fault, the state of memory at the time of the fault, etc.

One example of fault information can be illustrated with reference to a page fault in the IA-32 ISA. In the IA-32 ISA, a page fault is identified by a fault identifier equal to 14. Accordingly, when a page fault occurs, control is passed to a fault handler by vectoring to the fault handler through an interrupt descriptor table (IDT) at entry 14. The address being accessed (that generates the page fault) is stored in a control register (CR2). In addition, prior to passing control to the fault handler, the page fault generates an error code that is pushed onto the stack for use by the fault handler. The error code includes four bits that inform the fault handler what conditions caused the page fault. Specifically, bit 0 in the error code indicates whether the fault was caused by a non-present page in a page table used for address translation, bit 1 in the error code indicates whether the faulting access was a write, bit 2 in the error code indicates whether the access was originated when the processor was in user mode, and bit 3 in the error code indicates whether the fault was caused by a reserved bit set to 1 in a page directory.

Additional data values may be associated with the page fault. Examples of the associated additional data values include the address being accessed which caused the page fault (CR2), the address of the faulting instruction, the data value that the guest software was attempting to write to a non-writeable page in a page table hierarchy when a page fault occurs, the address of the page tables in physical and guest linear memory, etc.

Some embodiments of a filtering mechanism that utilizes control transfer filtering criteria will now be described. The control transfer filtering criteria may be defined either manually or programmatically. The control transfer filtering criteria vary depending on the specific fault, the form of the error code, the ISA, the presence of additional data values, the characteristics of the VMM and other factors. The complexity of the control transfer filtering criteria and the number of elements required to express the criteria depend on the number of values included in the error code, the number of additional data values, and the number of possible combinations of the error code values and/or the additional data values that need (and need not) to cause the transition to the VMM. For example, when a large number of such combinations need to be taken into account, the control transfer filtering criteria may require performing several operations (e.g., arithmetic and/or Boolean logic operations) on the error code and/or other fault information and a set of predefined data.

In some embodiments, the predefined data is stored in designated fields of the VMCS, as described above. In other embodiments, the predefined data may be hard-coded (e.g., in a computer program, programmable logic, microcode or the hard-coded logic of the processor).

Figure 2:
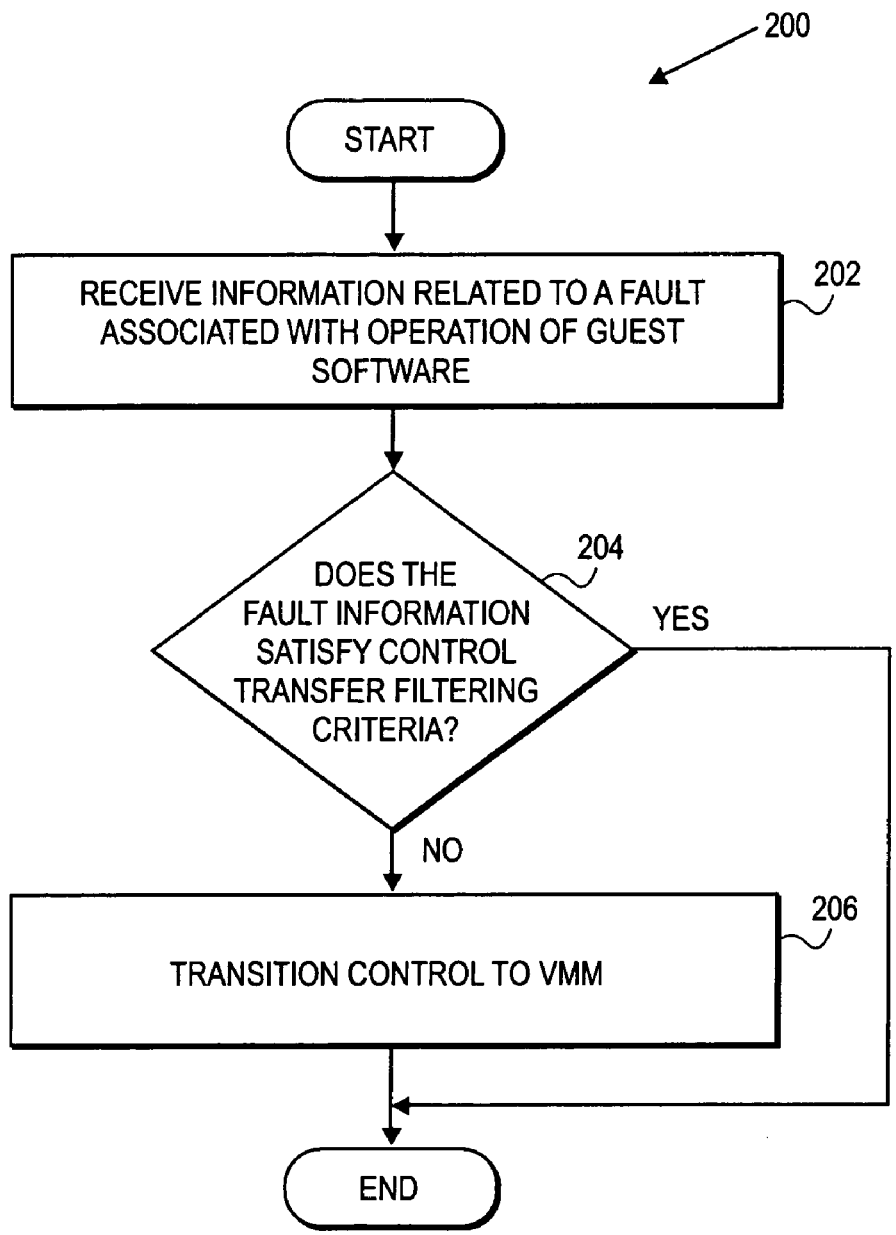
FIG. 2 is a flow diagram of one embodiment of a process for filtering VM exits due to faults using control transfer filtering criteria.

FIG. 2 is a flow diagram of one embodiment of a process 200 for filtering VM exits due to faults using control transfer filtering criteria. The process may be performed by processing logic that may comprise hardware (e.g., circuitry, dedicated logic, programmable logic, microcode, etc.), software (such as run on a general purpose computer system or a dedicated machine), or a combination of both.

Referring to FIG. 2, process 200 begins with processing logic receiving fault information (processing block 202). The fault information may be related to a fault that has already occurred or will occur if an operation is allowed to proceed to completion. The fault information includes a fault identifier that identifies the fault. In some embodiments, the fault information also includes an error code and/or additional data values associated with the fault.

At decision box 204, a determination is made as to whether the fault information satisfies one or more control transfer filtering criteria. If the determination made at decision box 204 is negative, i.e., the fault information does not satisfy the control transfer filtering criteria, the control is transitioned to the VMM (processing block 206) which handles the fault and may then transfer the control back to the guest OS. Otherwise, if the determination made at decision box 204 is positive, i.e., the fault information satisfies the control transfer filtering criteria, then the control remains with the guest software. The guest software can then be allowed to handle the fault.

In alternative embodiments, the control is transitioned to the VMM if the fault information does not satisfy the control transfer filtering criteria (and the control remains with the guest software if the fault information satisfies the control transfer filtering criteria).

As described above, the complexity of the control transfer filtering criteria depends on a variety of factors. In one embodiment, a control transfer filtering criterion may only require that the fault information be compared with a certain value (e.g., a VM exit will be generated if the error code is greater than 10 or a VM exit will be generated if the error code equals 0×4, etc.). In another embodiment, the control transfer filtering criteria may require that the fault information be compared with several values. For example, error code values that need to cause a transition to the VMM may be determined in advance, and the current error code may be compared to these predetermined values to identify a match. The predetermined value(s) may be stored in designated field(s) (e.g., in VMCS 122 of FIG. 1) or hard-coded in a computer program, programmable logic, microcode or the hard-coded logic of the processor. In yet other embodiments, the filtering mechanism may be required to perform one or more Boolean logic and/or arithmetic operations on the fault information and a set of predetermined values.

Figure 3:
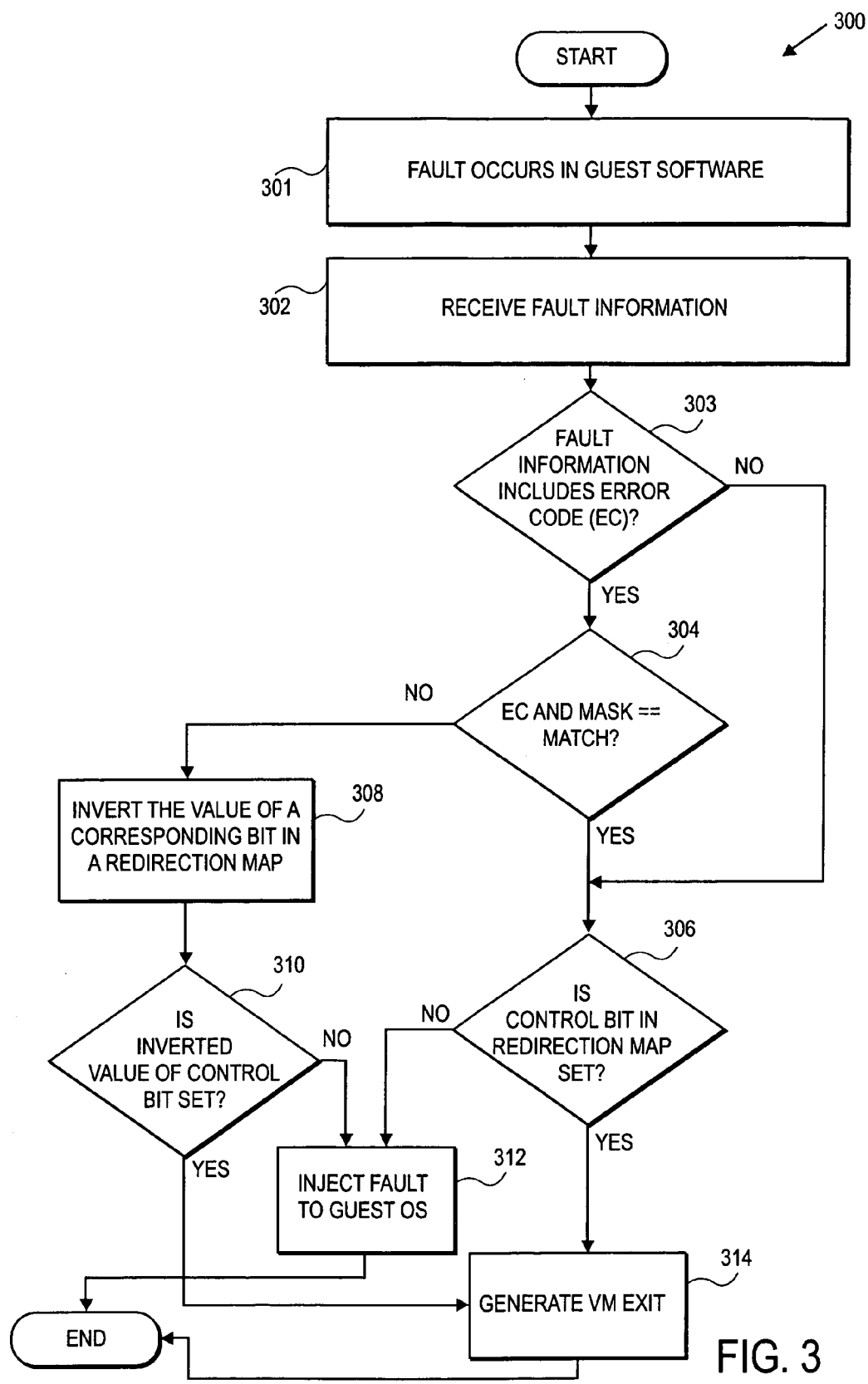
FIGS. 3–5 illustrate exemplary embodiments of a process for filtering VM exits due to faults using control transfer filtering criteria.
Figure 4:
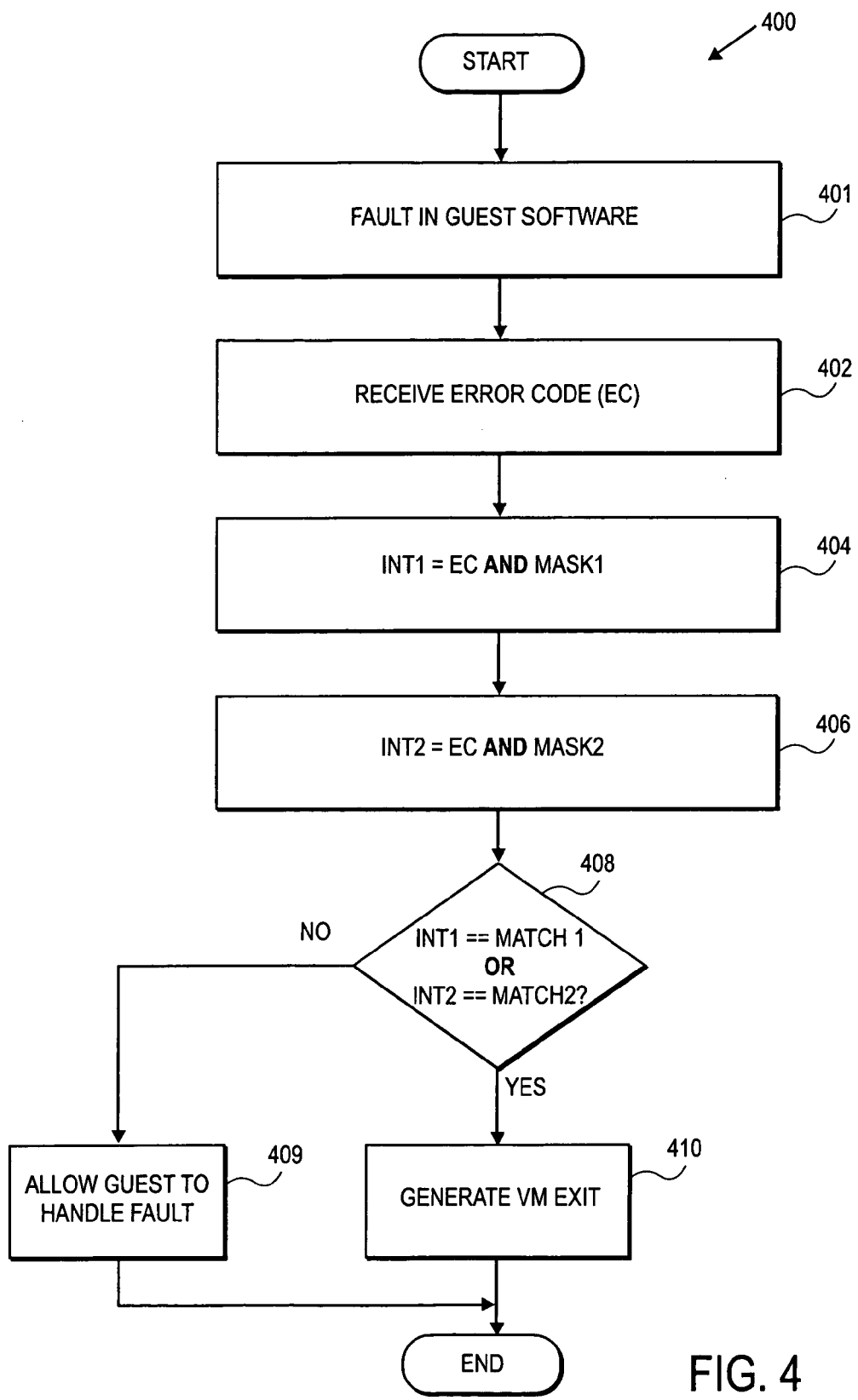
Figure 5:
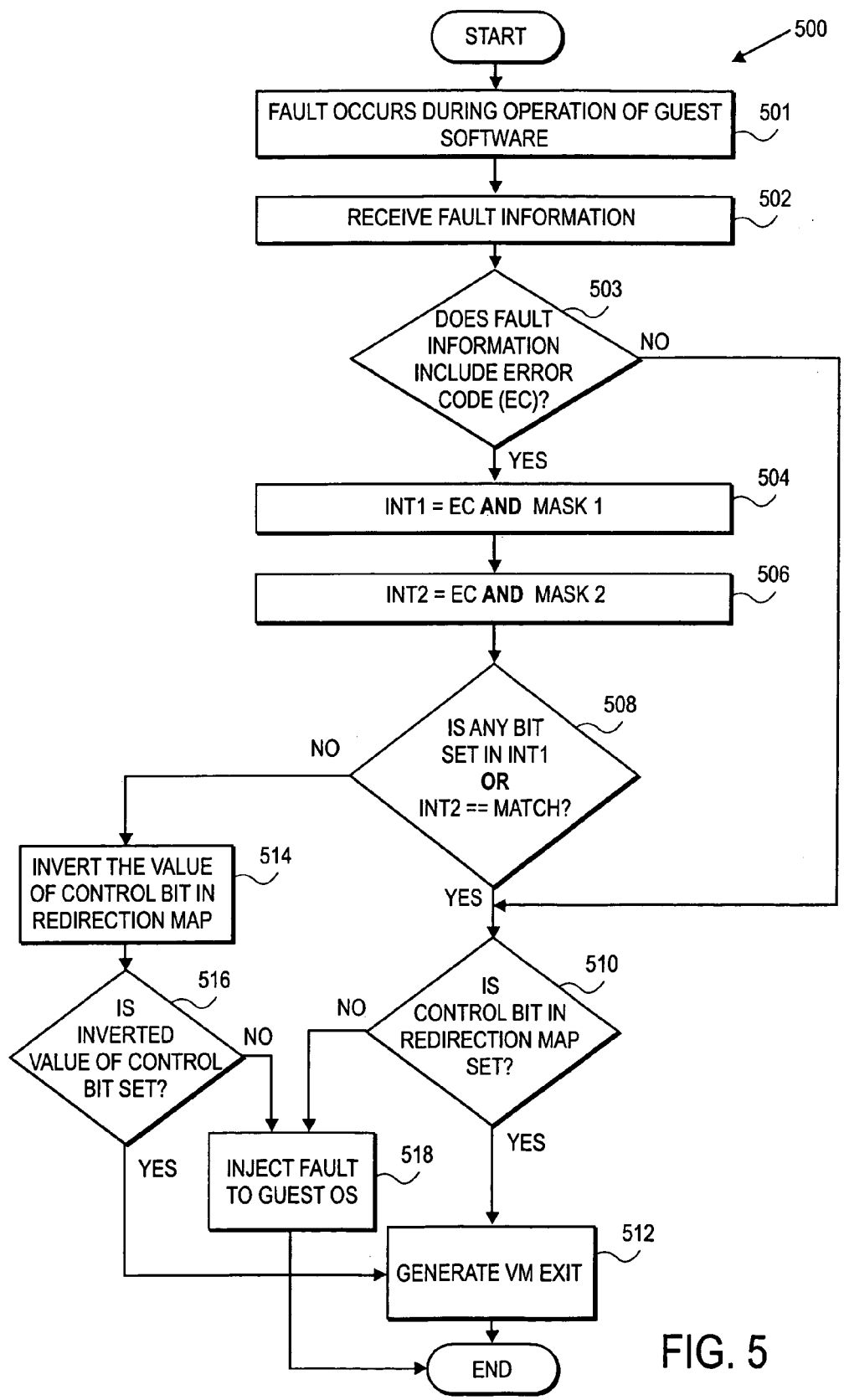

FIGS. 3–5 illustrate exemplary embodiments of processes for filtering VM exits due to faults using control transfer filtering criteria. The processes may be performed by processing logic that may comprise hardware (e.g., circuitry, dedicated logic, programmable logic, microcode, etc.), software (such as run on a general purpose computer system or a dedicated machine), or a combination of both.

Referring to FIG. 3, process 300 begins with processing logic detecting the occurrence of a fault during operation of guest software (processing block 301). At processing block 302, processing logic receives fault information that identifies the fault and may include other information relating to the fault. At decision box 303, processing logic determines whether the fault information includes an error code associated with the fault. If the determination is positive, processing logic determines (in processing block 304) the value (true or false) of the following expression:

$$EC \text{ AND } MASK == MATCH, \qquad (1)$$

where EC is the error code, AND is a bitwise Boolean logic operator, "==" is a bitwise comparison operator, MASK is predefined data stored in a first field referred to herein as a mask field, and MATCH is predefined data stored in a second field referred to herein as a match field.

The size of each of the mask and match fields depends on the size of the corresponding error code. In some embodiments, the widths of the mask and match fields are the same as the size of the error code. In other embodiments, the widths of the mask and match fields may not be the same as the size of the error code. For example, the mask and match fields may be smaller than the error code and may map only some bits into expression 1.

Further, in one embodiment illustrated in FIG. 3, processing logic also uses a corresponding control bit in a redirection map to make a further determination as to whether to generate a VM exit. The redirection map represents a set of control bits maintained by the VMM for configuring which virtualization events will cause a VM exit. The control bit being consulted corresponds to the virtualization event causing the current fault. For example, the virtualization event may be a page fault, an external interrupt, or an access to a debug register by guest software, each of which has an associated bit in the redirection map. In one embodiment, the redirection map is contained in the VMCS 122 of FIG. 1. In one embodiment, the redirection map is a single field in the VMCS 122. In other embodiments, multiple fields are required in the VMCS 122 to detail the redirection map.

If the determination made at decision box 303 is negative (i.e., the fault information does not include an error code associated with this fault) or processing logic determines at decision box 304 that the equality holds in expression 1 (i.e., the error code combined with data stored in the mask field via the bitwise AND operator matches data stored in the match field), then, in one embodiment, the value of the corresponding control bit in the redirection map is used to determine whether to generate a VM exit (processing block 306). For example, if the control bit is set, processing logic will generate a VM exit (processing block 313); otherwise, processing logic will deliver the fault to the guest software (processing block 312).

If the equality in expression 1 does not hold, processing logic inverts the value of the control bit in the redirection bitmap (processing block 308) and uses this inverted value to determine whether to generate a VM exit (processing block 310). If the inverted value is set, processing logic generates a VM exit (processing block 314); otherwise, the fault is vectored to the guest software (processing block 312). In another embodiment, processing logic can use the actual value of the control bit if, as determined in decision box 304, the equality does not hold, and the inverted value of the control bit if the equality holds.

The use of the mask and match fields with the control bit in process 300 of FIG. 3 can be illustrated using various values of an error code associated with the IA-32 ISA page fault (referred to herein as a page fault error code or PFEC) as an example. The following examples assume the presence of the inversion of the control bit if the equality in expression 1 does not hold (as shown in FIG. 3).

As discussed above, a PFEC includes four bits. In order to achieve the results desired for all possible combinations of PFEC values, each of the mask field, match field and control bit should have a specific setting. For example, to cause VM exits on all page faults, the control bit may be set to 1, the value of the mask field bits will be set to 0×0, and the value of the match field will be set to 0×0. Alternatively, to get the same behavior, the control bit may be set to 0, the mask field set to 0×0 and the match field set to 0×F (note that there are many settings of match, mask and control bit values that provide the same functionality). In another example, in order to cause VM exits on page faults resulting from supervisor writes to present pages, the control bit will be set to 1, the value of the mask field will be set to 0×F, and the value of the match field will be set to 0×3. These values ensure that VM exits will occur only on page faults that generate the error code equal to 0×3. In yet another example, in order to cause VM exits on page faults resulting from not-present pages or reserved-bit violations, the control bit will be set to 0, the value of the mask field will be set to 0×9 (i.e., only bits 0 and 3 are set to 1), and the value of the match field will be set to 0×1. This will cause VM exits on all page faults except those that indicate a present page (i.e., bit 0 is set to 1) and no reserved-bit violation (i.e., bit 3 cleared to 0).

In another embodiment (not shown), the control bit is not used. That is, processing logic determines whether to transition control to the VMM (i.e., to generate a VM exit) based on the result of expression 1. If the equality evaluated in expression 1 holds (i.e., the error code combined with data stored in the mask field via the bitwise AND operator matches data stored in the match field), then the control transfer filtering criteria is satisfied, and the fault associated with the error code will be handled by the guest operating system. Otherwise (i.e. the error code combined with data stored in the mask field via the AND operator does not match the data stored in the match field), then the control transfer filtering criteria is not satisfied, and a VM exit is generated to transition control to the VMM.

The inversion of the control bit used in the embodiment illustrated in FIG. 3 adds flexibility in achieving desired results (i.e., a VM exit result or a no-VM exit result) for various combinations of error code values. For example, the following table illustrates the two possible desired results for various combinations of values of an error code containing two bits:

| ERROR CODE BITS | | DESIRED RESULTS 1 | DESIRED RESULTS 2 |
|---|---|---|---|
| 0 | 0 | Exit | No exit |
| 0 | 1 | No exit | Exit |
| 1 | 0 | Exit | No exit |
| 1 | 1 | Exit | No exit |

The embodiment of process 300 illustrated in FIG. 3 can achieve the desired results 1 if the values of the mask field bits are equal to (1 1), the values of the match field are equal to (0 1), and the control bit is equal to 0. The desired results 2 can be achieved if the values of the mask field bits are equal to (1 1), the values of the match field are equal to (0 1), and the control bit is set to 1.

It should be noted that the desired results 2 do not require the use of the control bit (i.e., the desired results 2 only require that mask=(1 1) and match=(0 1)). However, the desired results 1 cannot be achieved unless the inversion of the control bit is used or more fields are involved in the process of determining whether to generate a VM exit.

An embodiment of a control transfer filtering process that uses four designated fields for determining whether to generate a VM exit is illustrated in FIG. 4. Referring to FIG. 4, process 400 may be performed by processing logic that may comprise hardware (e.g., circuitry, dedicated logic, programmable logic, microcode, etc.), software (such as run on a general purpose computer system or a dedicated machine), or a combination of both.

Process 400 begins with processing logic detecting the occurrence of a fault during operation of guest software (processing block 401). In the embodiment illustrated in FIG. 4, it is assumed that all faults generate error codes, which the processing logic receives in processing block 402. Next, processing logic uses the bitwise AND operator to combine the error code with data stored in a first mask field (processing block 404) and with data stored in a second mask field (processing block 406). That is, the result of the first combination INT1=EC AND MASK1 and the result of the second combination INT2=EC AND MASK2.

Further, at decision box 408, processing logic determines whether the first combination INT1 matches data stored in a first match field (MATCH1) or the second combination INT2 matches data stored in a second match field (MATCH2). If any match is found, processing logic generates a VM exit (processing block 410). Alternatively, if no match is found, the fault is injected to the guest operating system (processing block 409).

The control transfer filtering criteria can use more complex arithmetic or Boolean logic and/or additional fields to provide greater flexibility for the desired results, as illustrated in FIG. 5. Referring to FIG. 5, process 500 may be performed by processing logic that may comprise hardware (e.g., circuitry, dedicated logic, programmable logic, microcode, etc.), software (such as run on a general purpose computer system or a dedicated machine), or a combination of both.

Process 500 begins with processing logic detecting the occurrence of a fault during operation of guest software (processing block 501). At processing block 502, processing logic receives fault information. If, as determined by processing block 503, the fault information includes an error code, processing logic uses the bitwise AND operator to combine the error code with data stored in a first mask field (processing block 504) and with data stored in a second mask field (processing block 506). That is, the result of the first combination INT1=EC AND MASK1 and the result of the second combination INT2=EC AND MASK2.

Further, at decision box 508, processing logic determines whether any bit is set in the first combination INT1 or if the second combination INT2 matches data stored in a match field (MATCH). In one embodiment (not shown in FIG. 5), if either determination is positive, processing logic generates a VM exit. Otherwise, the fault is injected to the guest OS.

In another embodiment (shown in FIG. 5), the determination regarding a VM exit further depends on a corresponding control bit in a redirection map. Specifically, if the determination made at decision box 508 is positive (or if the determination made at decision box 503 is negative, i.e., the fault information does not include an error code), processing logic further determines at decision box 510 whether the control bit specifies a VM exit (e.g., the control bit is set to 1). If the control bit specifies a VM exit, processing logic generates the VM exit (processing block 512). If the control bit does not specify a VM exit (e.g., the control bit is clear), the fault is injected to the guest OS (processing block 518).

Otherwise, if the determination made at decision box 508 is negative, processing logic inverts the value of the control bit (processing block 514). If the inverted value specifies a VM exit (decision box 516), processing logic generates the VM exit (processing block 512). If the inverted value does not specify a VM exit, the fault is injected to the guest OS (processing block 518).

Although the embodiments depicted in FIGS. 3–5 utilize certain operators (i.e., bitwise AND, compare, etc.), a wide variety of other operators can be used with filtering criteria without loss of generality. In addition, various filtering criteria other than those discussed above in conjunction with FIGS. 3–5 can be used to process faults occurred during the operation of guest software. Further, additional data values discussed above can be used instead of, or together with, an error code associated with the fault during the filtering process.

In some embodiments, additional filtering criteria (referred to herein as fault filtering criteria) are applied to fault information prior to the control transfer filtering criteria. In other embodiments, the fault filtering criteria are applied to the fault information after the control transfer filtering criteria. In yet other embodiments, the fault filtering criteria but not the control transfer filtering criteria are applied to the fault information. The fault filtering criteria are used to determine whether a faulting condition occurring during the operation of guest software can be disregarded. A faulting condition represents an event that would normally cause a fault if the operation is allowed to complete. One example of such a faulting condition is an attempt by guest software to write to a non-writable page in a page table hierarchy. In some situations, a faulting condition can be disregarded because other factors present at the time of the faulting condition indicate that the faulting condition would not, for example, compromise the performance, security or proper operation of the VMM or other virtual machines. Examples of such situations will be described in more detail below in conjunction with FIGS. 7 and 8.

Figure 6:
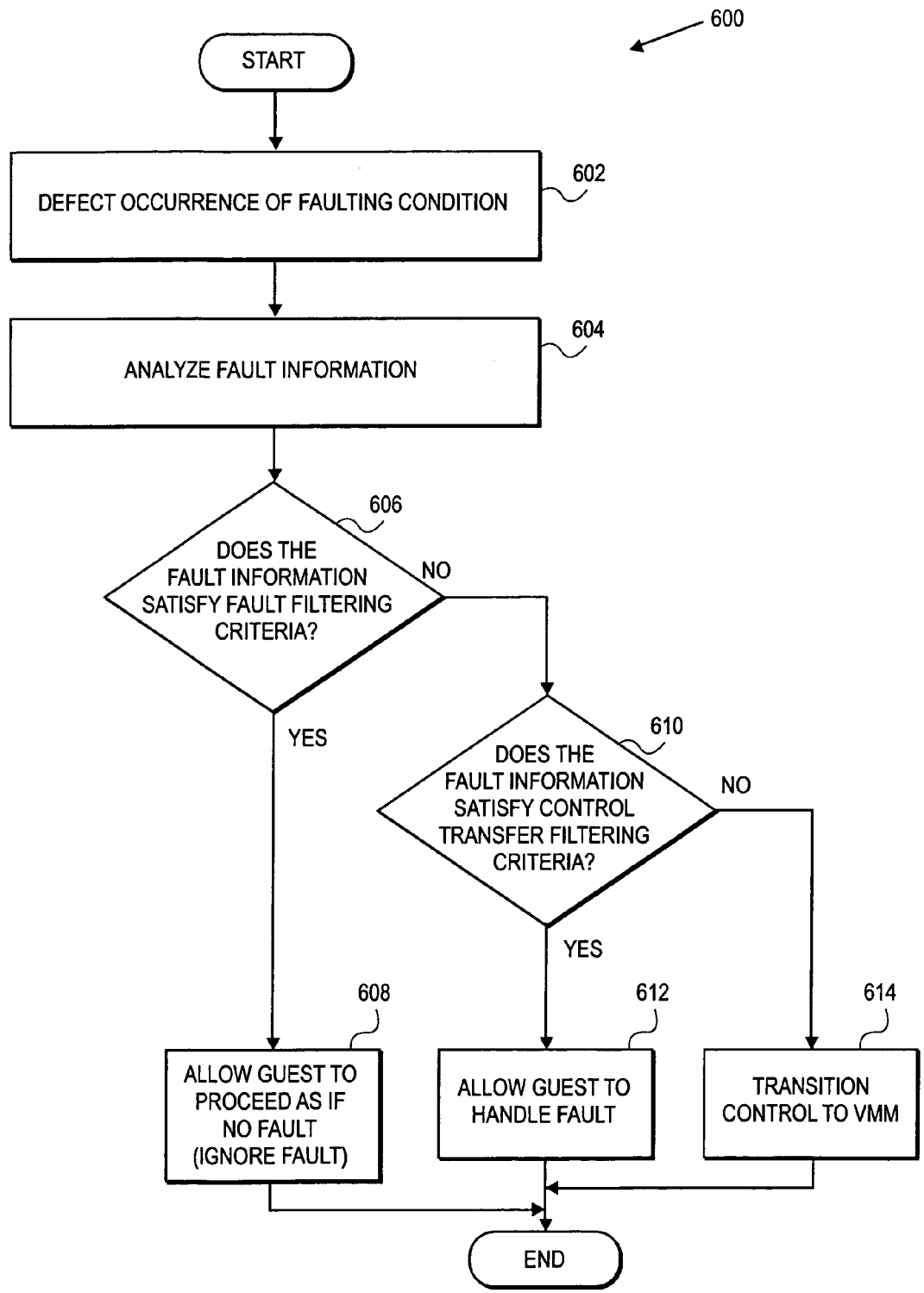
FIG. 6 is a flow diagram of one embodiment of a process for filtering faults and VM exits due to faults using fault filtering criteria and control transfer filtering criteria.

FIG. 6 is a flow diagram of one embodiment of a process 600 for filtering faults and VM exits due to faults using fault filtering criteria and control transfer filtering criteria. The process may be performed by processing logic that may comprise hardware (e.g., circuitry, dedicated logic, programmable logic, microcode, etc.), software (such as run on a general purpose computer system or a dedicated machine), or a combination of both.

Process 600 begins with processing logic detecting an occurrence of a faulting condition during the operation of guest software (processing block 602) and analyzing fault information pertaining to the faulting condition (processing block 604). Such fault information may include the fault identifier, error code, faulting address, data to be written, page table address, etc.

Next, processing logic determines whether the fault information satisfies fault filtering criteria (decision box 604). The fault filtering criteria require evaluation of one or more elements of processor state, memory state and/or the fault information using rules concerning the operation of guest software. For example, the fault filtering criteria may require comparing data that guest software attempts to write to a memory location with data that is currently stored in this memory location. The fault filtering criteria may require a single check of an element of processor state, memory state and/or the fault information or multiple checks of various elements. The complexity of the fault filtering criteria may vary depending on the specific faulting condition, the operation rules pertaining to the faulting condition, the ISA, the characteristics of the VMM, the application, and other factors. Exemplary filtering criteria are discussed in more detail below in conjunction with FIGS. 7 and 8.

If the fault filtering criteria are satisfied, processing logic ignores the faulting condition and permits the guest software to proceed as if the faulting condition had not been detected (processing block 608). As a result, the behavior of the operation initiated by the guest software is modified to allow its completion despite the detection of the faulting condition.

If the fault filtering criteria are not satisfied, processing logic determines a proper entity for handling the fault using control transfer filtering criteria (decision box 610). If the fault information satisfies the control transfer filtering criteria, then processing logic delivers the fault to the guest software and permits the guest software to handle the fault (processing block 612). If the fault information does not satisfy the control transfer filtering criteria, then processing logic transitions control to the VMM (processing block 614).

In other embodiments, if the fault filtering criteria are not satisfied, processing logic does not use the control transfer filtering criteria and always transitions control the VMM.

In yet other embodiments, processing logic first determines a proper entity for handling the fault using control transfer filtering criteria. Then, if the proper entity is guest software, processing logic further determines whether the fault filtering criteria is satisfied. If the fault filtering criteria are satisfied, the guest is allowed to ignore the fault condition; if the fault filtering criteria is not satisfied, the fault is delivered to the guest, as above.

The following discussions assume page table structures as in the IA-32 ISA; however, it should be noted that similar page table structures exist in a variety of ISAs and the invention is not limited by the use of the IA-32 ISA. Additionally, various simplifications are made to facilitate the following discussions. For example, the effect of the physical address extension (PAE) and page-size extension (PSE) flags are not included, ring based protection mechanisms are not accounted for, requirements for alignment of memory accesses are not tested, etc.

As well known in the art, page tables in the IA-32 ISA are composed of page directory entries (PDEs) and page table entries (PTEs). Each PDE and PTE includes various bit fields that control the accessibility of memory pages. For example, the "P" bit marks pages as present (1) or not present (0), the "R/W" bit indicates whether pages are read only (0) or writable and readable (1), the "U/S" bit indicates whether pages require supervisor privilege, the page frame number (PFN) contains a portion of the physical address at which the logical page is located, etc. CR3 is a control register in the ISA that contains the physical address of the base of the page directory (and additional flags). The page directory base physical address is equal to CR3[31:12]<<12 (i.e., the lower 12 bits of the page directory base address are 0 and the upper 20 bits are located in the upper 20 bits of CR3).

In order to prevent erroneous or malicious code in one virtual machine from compromising code executing in the VMM or another virtual machine, it is necessary to limit the access of guest software to the physical memory resources of the underlying physical machine. In some architectures, in which separate page table hierarchies managed by guest OSes and the VMM respectively are provided, one approach for limiting the access of guest software to the physical memory resources includes the VMM modifying permissions of the guest page table hierarchies to prevent read or write operations by guest software to protected pages (e.g., pages which belong to the VMM or other VMs). Additionally, the guest page tables are modified to prevent write operations to some pages belonging to the VM which store the guest page tables. Once these permission modifications have been made, attempts by guest software to alter the page table will cause page fault events that the VMM can observe through VM exits. The VMM can examine the attempted access and determine the appropriate actions to be taken. For instance, it may permit, disallow or modify the attempted access. For example, the guest software may not be allowed to map a physical page that belongs to the VMM or another VM. As modifications to page tables by the guest software occur frequently, the overhead associated with exiting to the VMM for screening each attempted guest page table change may impose a substantial performance burden.

In order to simplify the management of page tables, several operating systems, as for example Microsoft Windows XP, employ a recursive page directory. In other words, a page directory entry (PDE) will be set to reference the page directory page as a page table page. This use of the same page as both a page directory and a page table results in all of the page table pages being accessible in the 4 MB region of the linear address space accessed through the self-referential PDE. Given the use of a self-referential PDE, the linear address of the PTE or PDE which is used to map any particular linear address may be calculated. In operating systems employing a self-referential PDE, typical page table edits are made through this self mapped region (i.e., the edits to the page table are done via writes to memory which use linear addresses falling in the 4 MB region using the self-mapping PDE). The edits of the page tables that do not use this self-mapped PDE are few in number.

A page table in which a common page is used as both the page directory page and page table page is referred to herein as a self-mapped page table. It will be apparent to one skilled in the art that this invention also applies to other approaches in which page table entries are mapped to linear addresses in an organized fashion, whether such mapping is a result of the re-use of structures at multiple levels in a page table hierarchy, or through OS conventions.

In one embodiment of the invention, a filtering mechanism is employed to identify page map edits that do not require an exit to the VMM. In this embodiment, additional fields for filtering criteria are added to the VMCS.

In one embodiment, the page tables used by the guest operating system are self-mapped, i.e., one of the page directory entries (PDEs) in the page table hierarchy points back to the base of the page-directory (PD) page. As discussed above, the concept of self-mapped page tables is well understood in the art and is used by operating systems such as, for example, Microsoft's Windows XP. In one embodiment, the self-mapping is supported by ensuring that the linear address of the base of the page directories (referred to herein as PTBASE) satisfies a set of conditions. The set of conditions may verify that the PTBASE value is a 4-MB aligned, i.e., PTBASE[21:0]==0, and the page table contains the appropriate self-mapping entry, i.e., the PFN in the entry at location ((CR3[31:12]<<12)+(PTBASE[31:22]<<2)) equals CR3[31:12]. In one embodiment, the PTBASE value is stored in the VMCS for use by the filtering mechanisms, as described below.

Given that a self-mapping page table is in use, it may be determined if any given address falls within the page table (i.e., if ADDR[31:22]==PTBASE[31:22], where ADDR is the address being accessed). Additionally, it may be determined if the address is within a PDE (i.e., if the address is in the page table and ADDR[21:12]==PTBASE[31:22]) or PTE (i.e., if the address is in the page table and it is not within a PDE).

Figure 7:
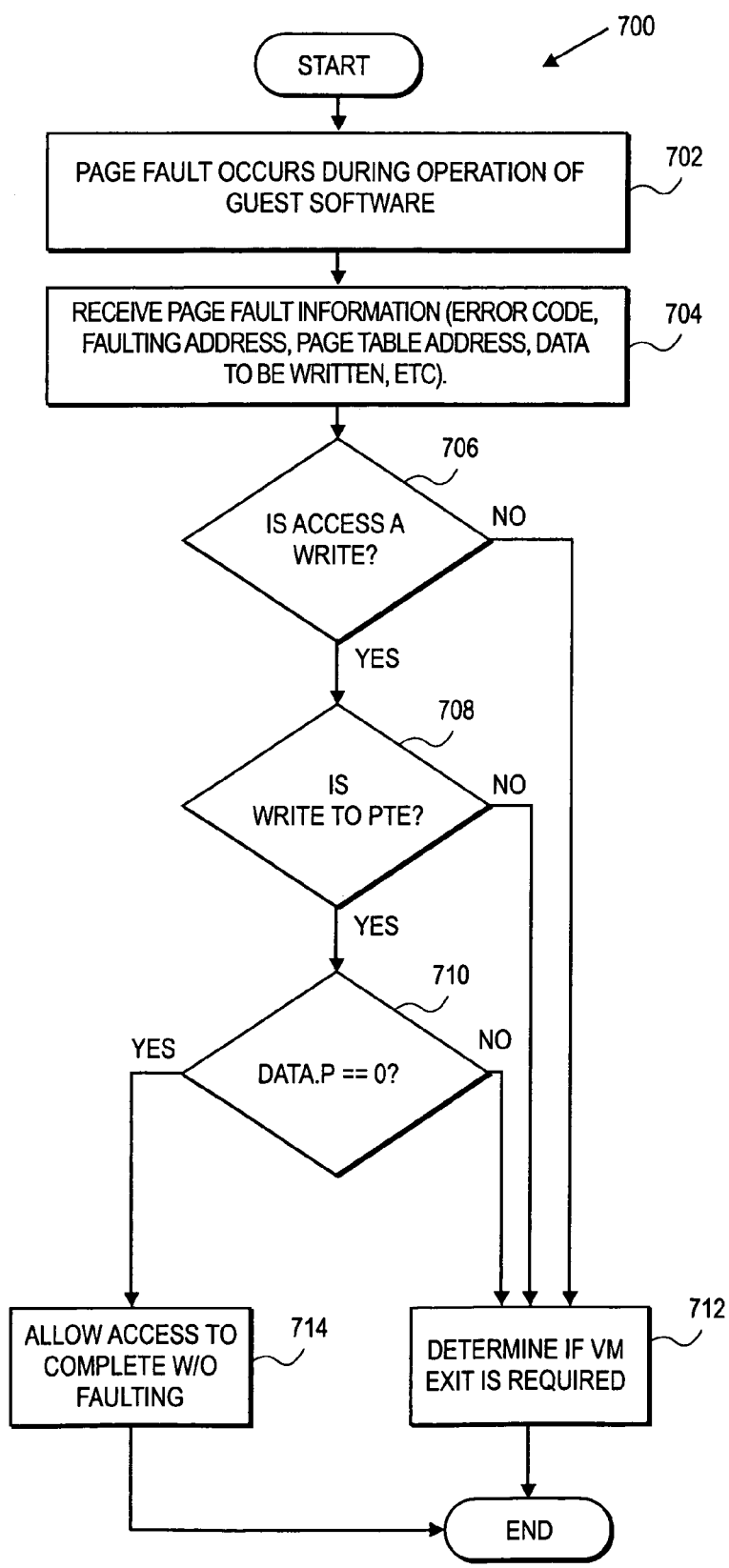
FIGS. 7–8 illustrate exemplary embodiments of a process for filtering faults using fault filtering criteria.
Figure 8:
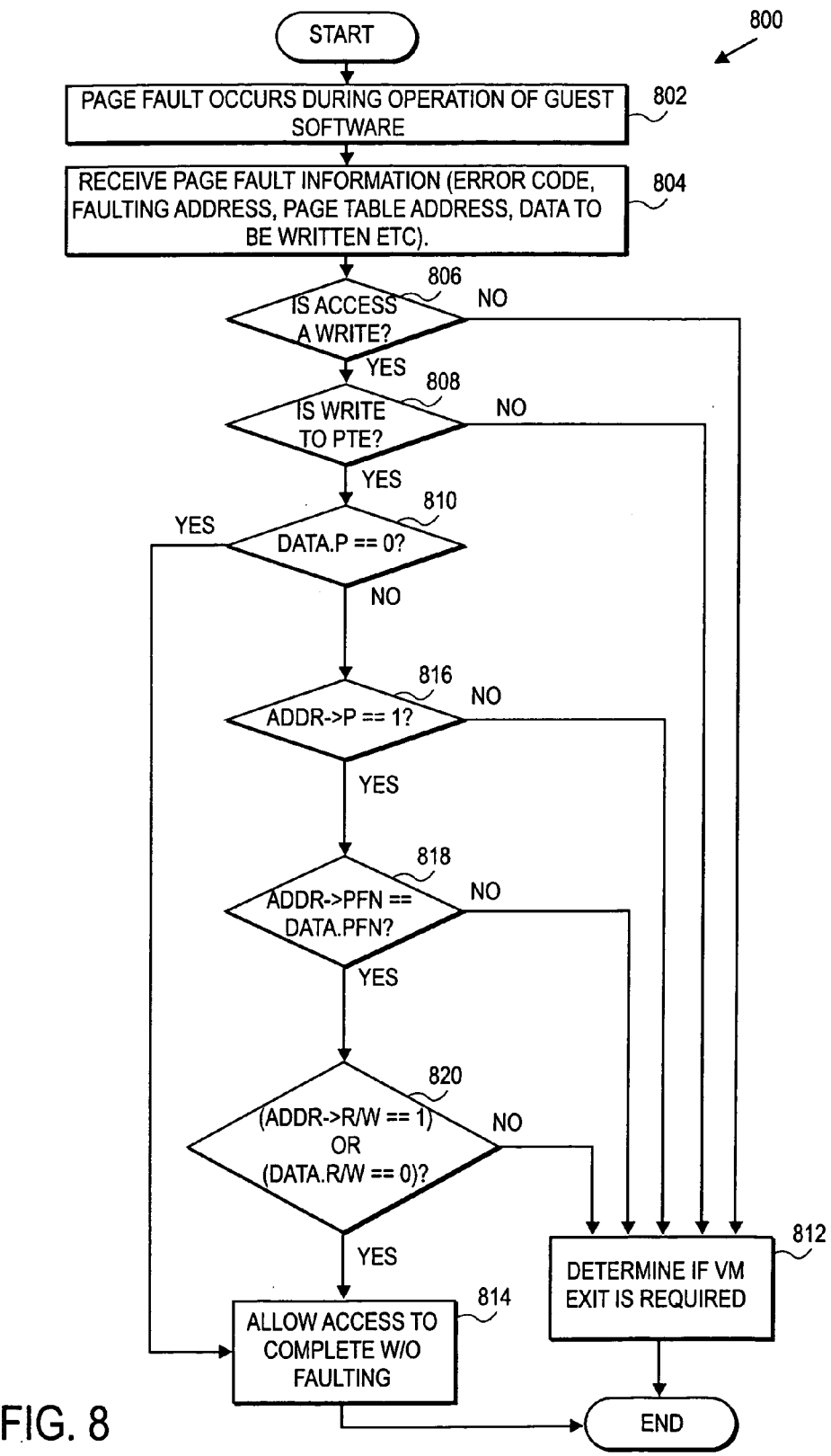

FIGS. 7 and 8 illustrate two exemplary embodiments of a process for filtering page faults using fault filtering criteria. The process may be performed by processing logic that may comprise hardware (e.g., circuitry, dedicated logic, programmable logic, microcode, etc.), software (such as run on a general purpose computer system or a dedicated machine), or a combination of both. In the embodiments illustrated in FIGS. 7 and 8, the VMM protects physical memory by ensuring that the guest page table entries (guest PTEs) that map the page table itself have the read-only access. As a result, when guest software attempts to change the page table entries, a page fault condition occurs. These embodiments may be used with the guest OS utilizing self-mapped page tables, as described above, or with the guest OS that is not using this page table structure, although the use of the guest OS utilizing self-mapped page tables provides greater performance improvement.

In the embodiment shown in FIG. 7, the set of fault filtering criteria is illustrated that permits a write to a PTE to complete without delivering a fault or causing a VM exit if the guest operating system is not attempting to set the "P" bit to 1 while still protecting the physical memory space and refraining from giving the guest software full control of the page table. The rationale for this rule is that a PTE marked non-present (i.e., "P" bit is equal to 0) cannot map a physical memory page. Therefore, the PTE being changed by the guest software cannot map a physical memory page and as such cannot interfere with the operation of the VMM or software running in another VM. Hence the VMM need not be notified of the page table modification, and the page table write will be permitted to proceed without causing a page fault or VM exit.

Referring to FIG. 7, processing logic begins with detecting a page fault condition during operation of guest software (processing block 702) and receiving page fault information related to the page fault condition (processing block 704).

Next, a set of fault filtering criteria is applied to the page fault information. Specifically, processing logic determines whether the faulting access is a write operation (decision box 706) to a PTE (decision box 708) and not an attempt to set the "P" bit to 1 (i.e., DATA. P==0, where DATA is the value that the guest is trying to write) (decision box 710). If these determinations are positive, the access of the guest operating system is allowed to complete (i.e., the write is allowed to modify memory) without causing a fault or VM exit (processing block 714). If any of the determinations in processing blocks 706, 708 and 710 are negative, control is transferred to processing block 712 to determine whether a VM exit is to be generated or the fault is to be vectored to the guest software, as described in more detail in conjunction with FIGS. 2–5.

In another embodiment (not shown in the figures), the qualification that the write must be to a PTE may be removed or replaced with, for example, a test that allows writes to a PTE or a PDE as long as the present bit is not being set.

Referring to FIG. 8, a more complicated set of fault filtering criteria is illustrated that includes the fault filtering criteria described above in conjunction with FIG. 7 and some additional criteria. This set of fault filtering criteria allows the guest operating system to modify bits in the PTE other than the PFN, read/write and present bits without requiring a page fault or causing a VM exit. Additionally certain modifications of the read/write and present bits are allowed without requiring a page fault or causing a VM exit.

Processing logic begins with detecting a page fault condition during operation of guest software (processing block 802) and receiving page fault information related to the page fault condition (processing block 804). Next, processing logic determines whether the faulting access is a write operation (decision box 806) to a PTE (decision box 808) and not an attempt to set the "P" bit to 1 (i.e., DATA. P==0) (decision box 810). If these determinations are all positive, the access of the guest operating system is allowed to complete (i.e., the write is allowed to modify memory) without causing a fault or VM exit (processing block 814). If the determinations in processing blocks 806 or 808 are negative, control proceeds to processing block 812 to determine whether a VM exit is required, as described with reference to FIGS. 2–5.

If the determination in processing block 810 is negative, the additional fault filtering rules are applied. Specifically, processing logic determines whether the PTE is already marked as present in the PTE (i.e. ADDR−>P==1, where ADDR is the address to which the guest software is attempting to write and ADDR−>P represents the P bit if the data in memory located at ADDR is interpreted as a PTE) (decision box 816), whether the PFN is not being changed (i.e. ADDR−>PFN==DATA. PFN) (decision box 818), and whether either the guest is attempting to mark the page mapped by the PTE as read-only (DATA. R/W==0) or the page being mapped by the PTE was already marked writeable in the PTE in memory (ADDR−>R/W==1) (decision box 820). If these determinations are positive, the access of the guest operating system is allowed to complete (i.e., the write is allowed to modify memory) without causing a fault or VM exit (processing block 814). If any of the determinations in processing blocks 816, 818 and 810 are negative, control is transferred to processing block 812 to determine whether a VM exit is required.

It should be noted that the filtering mechanisms depicted in FIGS. 7 and 8 will filter out accesses which attempt to modify the page tables using the self-mapped PDE, as described above. Attempts to modify the page tables that are not using the self-mapped PDE will not be filtered out by the fault filtering criteria (i.e., the determination of whether the write is to a PTE in blocks 708 and 808 will fail). Control transfer filtering criteria will then be used to determine if a VM exit is needed as described in FIGS. 2–5. This does not pose problems from either a security or correct operation standpoint since the VMM will be able to determine if a PTE is in fact being edited. The control transfer filtering mechanism will be configured to cause VM exits on all write page faults and evaluate the address and data being written to determine if a page table edit is being attempted.

A variety of fault filtering criteria other than those described above with reference to FIGS. 7 and 8 can be used to filter faults without loss of generality. The form of the filtering may be controlled by various VMM controlled fields (e.g. PTBASE) which, in an embodiment, may reside in the VMCS. Alternatively, the filtering may be controlled by a single enable bit, may be hard-coded into a processor implementation, etc.

Figure 9:
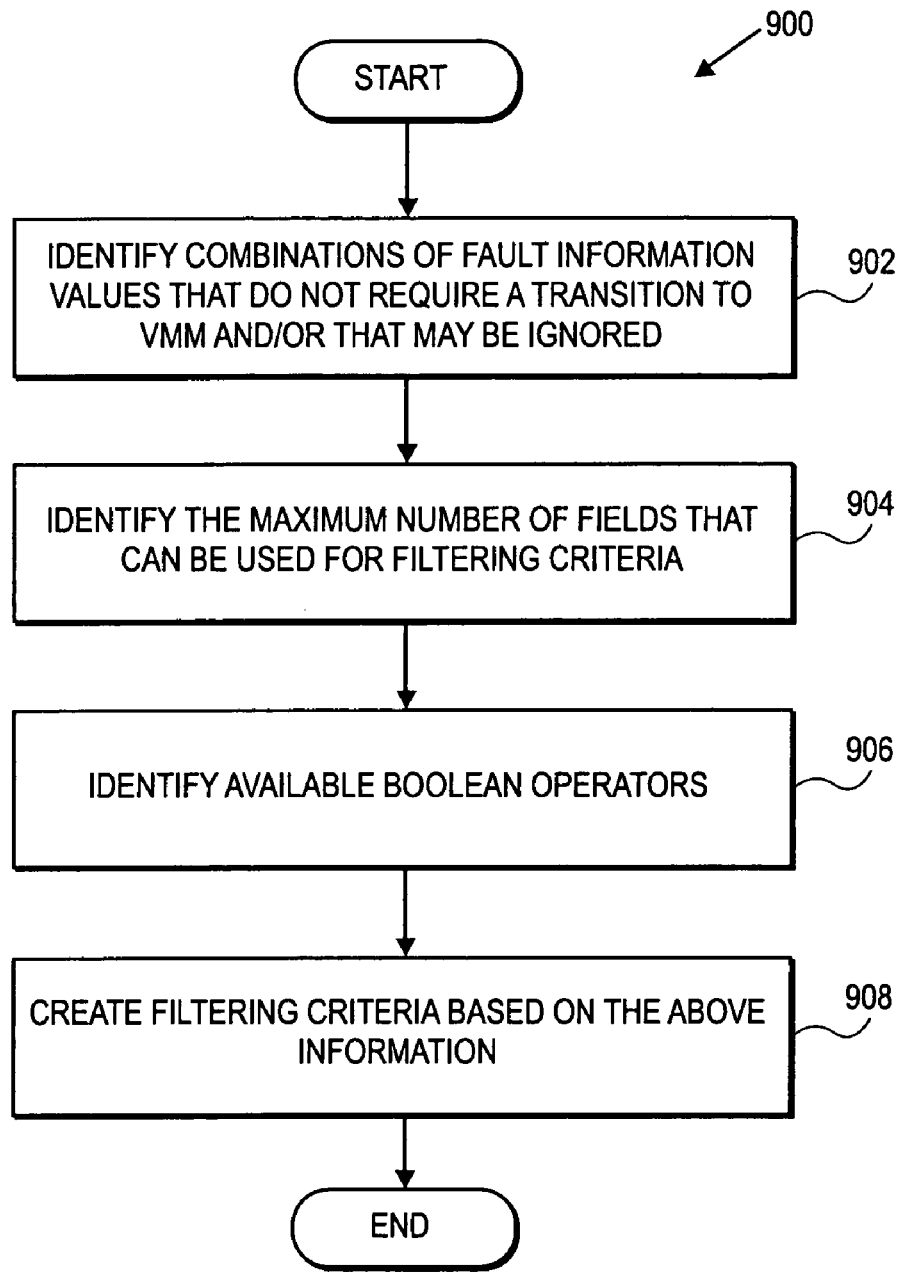
FIG. 9 is a flow diagram of one embodiment of a process for defining fault filtering criteria and control transfer filtering criteria.

FIG. 9 is a block diagram of one embodiment of a process 900 for defining control transfer filtering criteria and/or fault filtering criteria. Process 900 can be performed manually or automatically.

Referring to FIG. 9, process 900 begins with identifying which combinations of fault information (e.g. error code values, fault identifiers, etc.) do not require a transition to the VMM or, alternatively, should be allowed to complete, disregarding the fault (processing block 902). Then, the maximum number of fields and the semantics of the fields that can be used for the VM exit and/or fault filtering criteria is identified (processing block 904) and the available operators (e.g. Boolean, arithmetic, etc.) are identified (processing block 906). Further, based on the information identified at processing blocks 902–906, the filtering criteria are created (processing block 908). The filtering criteria may include one or more predefined values and one or more Boolean logic and/or arithmetic operations to be performed on the predefined values and the error code.

Thus, a method and apparatus for handling faults occurring during the operation of guest software have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving fault information relating to a fault associated with an operation of guest software, the fault information comprising at least one of a fault identifier, an error code associated with the fault, and one or more additional data values associated with the fault;
determining whether the fault information satisfies at least one filtering criterion;
refraining from transitioning control to a virtual machine monitor (VMM) if the fault information satisfies the at least one filtering criterion; and
transitioning control to the VMM if the fault information does not satisfy the at least one filtering criterion.

2. The method of claim 1 wherein:
the at least one filtering criterion is at least one control transfer filtering criterion; and
refraining from transitioning control to the VMM further comprises delivering the fault to the guest software if the fault information satisfies the at least one control transfer filtering criterion.

3. The method of claim 1 wherein the fault represents any one of an interrupt, an exception, and a platform event.

4. The method of claim 1 wherein the fault information includes a number of values, each of the number of values being indicative of an occurrence of a particular condition.

5. The method of claim 4 wherein one or more combinations of values of the fault information require a transition to the VMM.

6. The method of claim 1 wherein the at least one filtering criterion is defined using data stored in one or more designated fields.

7. The method of claim 6 wherein the one or more designated fields include a match field and a mask field.

8. The method of claim 6 wherein determining whether the fault information satisfies the at least one filtering criterion comprises combining the fault information with the data stored in one or more designated fields using one or more Boolean logic operations.

9. A method comprising:
determining whether a fault associated with an operation of guest software requires a transition of control to a virtual machine monitor (VMM) using fault information relating to the fault and at least one control transfer filtering criterion, wherein the at least one control transfer filtering criterion is defined using data stored in one or more designated fields, the one or more designated fields comprising a match field and a mask field; and
delivering the fault to the guest software if the fault information satisfies the at least one control transfer filtering criterion.

10. The method of claim 9 wherein the fault information is at least one of a fault identifier, an error code associated with the fault and one or more additional data values associated with the fault.

11. The method of claim 9 wherein the fault represents any one of an interrupt, an exception, and a platform event.

12. The method of claim 9 wherein determining whether the fault associated with the operation of the guest software requires a transition of control to the VMM comprises:
combining the fault information with data stored in the mask field using a bitwise AND operator; and
determining whether the result of the combination matches the data stored in the match field.

13. The method of claim 12 wherein determining whether the fault associated with the operation of the guest software requires a transition of control to the VMM further comprises:
determining that the result of the combination matches the data stored in the match field; and
identifying a value of a corresponding bit in a redirection map, the value of the corresponding bit indicating whether the fault requires a transition of control to the VMM.

14. The method of claim 12 wherein determining whether the fault associated with the operation of the guest software requires a transition of control to the VMM further comprises:
determining that the result of the combination does not match the data stored in the match field;
identifying a value of a corresponding bit in a redirection map; and
inverting the value of the corresponding bit, the inverted value of the corresponding bit indicating whether the fault requires a transition of control to the VMM.

15. A system comprising:
a memory having stored therein guest software; and
a processor, coupled to the memory, to execute the guest software, to determine whether fault information relating to a fault associated with an operation of the guest software satisfies at least one filtering criterion, the fault information comprising at least one of a fault identifier, an error code associated with the fault, and one or more additional data values associated with the fault, to refrain from transitioning control to a virtual machine monitor (VMM) if the fault information satisfies the at least one filtering criterion, and to transition control to the VMM if the fault information does not satisfy the at least one filtering criterion.

16. The system of claim 12 wherein:

the at least one filtering criterion is at least one control transfer filtering criterion; and the processor is to refrain from transitioning control to the VMM by delivering the fault to the guest software if the fault information satisfies the at least one control transfer filtering criterion.

17. A system comprising:

a memory having stored therein guest software; and a processor, coupled to the memory, to execute the guest software, to determine whether a fault associated with an operation of guest software requires a transition of control to a virtual machine monitor (VMM) using fault information relating to the fault and at least one control transfer filtering criterion, wherein the at least one control transfer filtering criterion is defined using data stored in one or more designated fields, the one or more designated fields comprising a match field and a mask field, and to deliver the fault to the guest software if the fault information satisfies the at least one control transfer filtering criterion.

18. The system of claim 17 wherein the processor is to determine whether the fault associated with the operation of the guest software requires a transition of control to the VMM by combining the fault information with data stored in the mask field using a bitwise AND operator, and determining whether the result of the combination matches the data stored in the match field.

19. A machine-readable medium containing instructions which, when executed by a processing system, cause the processing system to perform a method, the method comprising:

receiving fault information relating to a fault associated with an operation of guest software, the fault information comprising at least one of a fault identifier, an error code associated with the fault, and one or more additional data values associated with the fault;

determining whether the fault information satisfies at least one filtering criterion;

refraining from transitioning control to a virtual machine monitor (VMM) if the fault information satisfies the at least one filtering criterion; and transitioning control to the VMM if the fault information does not satisfy the at least one filtering criterion.

20. The machine-readable medium of claim 19 wherein:

the at least one filtering criterion is at least one control transfer filtering criterion; and refraining from transitioning control to the VMM comprises delivering the fault to the guest software if the fault information satisfies the at least one control transfer filtering criterion.

21. A machine-readable medium containing instructions which, when executed by a processing system, cause the processing system to perform a method, the method comprising:

determining whether a fault associated with an operation of guest software requires a transition of control to a virtual machine monitor (VMM) using fault information relating to the fault and at least one control transfer filtering criterion, wherein the at least one control transfer filtering criterion is defined using data stored in one or more designated fields, the one or more designated fields comprising a match field and a mask field; and delivering the fault to the guest software if the fault information satisfies the at least one control transfer filtering criterion.

22. The machine-readable medium of claim 21 wherein the processor is to determine whether the fault associated with the operation of the guest software requires a transition of control to the VMM by combining the fault information with data stored in the mask field using a bitwise AND operator, and determining whether the result of the combination matches the data stored in the match field.

\* \* \* \* \*